US012459924B2

(12) United States Patent
Kantzer et al.

(10) Patent No.: US 12,459,924 B2
(45) Date of Patent: Nov. 4, 2025

(54) PROCESS FOR MANUFACTURING ALKYLENEAMINE COMPOUNDS

(71) Applicant: NOURYON CHEMICALS INTERNATIONAL B.V., Arnhem (NL)

(72) Inventors: Eike Nicolas Kantzer, Uddevalla (SE); Karl Fredrik Lake, Södertälje (SE); Robert Kristoffer Berg, Rönninge (SE); Rolf Krister Edvinsson, Partille (SE); Antoon Jacob Berend Ten Kate, Arnhem (NL); Ina Ehlers, Stenungsund (SE); Hendrik Van Dam, Ede (NL); Michiel Jozef Thomas Raaijmakers, Deventer (NL); Rens Veneman, Amersfoort (NL); Slavisa Jovic, Utrecht (NL); Lawien Feisal Zubeir, Deventer (NL)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 1063 days.

(21) Appl. No.: 17/310,499

(22) PCT Filed: Feb. 4, 2020

(86) PCT No.: PCT/EP2020/052777
§ 371 (c)(1),
(2) Date: Aug. 6, 2021

(87) PCT Pub. No.: WO2020/161146
PCT Pub. Date: Aug. 13, 2020

(65) Prior Publication Data
US 2022/0194927 A1 Jun. 23, 2022

(30) Foreign Application Priority Data
Feb. 7, 2019 (EP) .................................. 19155974

(51) Int. Cl.
C07D 403/12 (2006.01)
C07C 209/62 (2006.01)
C07D 233/36 (2006.01)
C07D 241/04 (2006.01)

(52) U.S. Cl.
CPC .......... C07D 403/12 (2013.01); C07C 209/62 (2013.01); C07D 233/36 (2013.01); C07D 241/04 (2013.01)

(58) Field of Classification Search
CPC .. C07D 403/12; C07D 241/04; C07C 209/62; C07C 233/36
See application file for complete search history.

(56) References Cited

U.S. PATENT DOCUMENTS

| | | | |
|---|---|---|---|
| 2,769,841 A | 11/1956 | Dulude et al. | |
| 2,787,619 A | 4/1957 | Yost | |
| 4,387,249 A | 6/1983 | Harnden et al. | |
| 8,188,318 B2* | 5/2012 | Petraitis | C07C 209/08 564/470 |
| 9,440,928 B2 | 9/2016 | Gupta et al. | |
| 11,214,549 B2* | 1/2022 | Kantzer | C07C 209/16 |

FOREIGN PATENT DOCUMENTS

| | | |
|---|---|---|
| CA | 2249171 A1 | 4/1999 |
| CN | 103732579 A | 4/2014 |

(Continued)

OTHER PUBLICATIONS

Cano C et al: "1-Substituted (Dibenzo[b,d ]thiophen-4-yl)-2-morpholino-4 H-chromen4-ones Endowed with Dual DNA-PK/PI3-K Inhibitory Activity", Journal of Medicinal Chemistry, vol. 56, No. 16, Aug. 22, 2013 (Aug. 22, 2013), pp. 6386-6401, XP055578892.
Dalin Ar et al: "Nucleophilic cleavage 11 and the formation of saturated heterocycles. VII. Kinetic and thermochemical study of reactions of aziridine with ethylene amines", Journal of General Chemistry of the USSR, vol. 58, No. 9, 1988, pp. 1868-1871, XP055579625.

(Continued)

*Primary Examiner* — Andrew D Kosar
*Assistant Examiner* — Gillian A Hutter
(74) *Attorney, Agent, or Firm* — Ingrassia, Fisher & Lorenz, LLP

(57) ABSTRACT

The present disclosure pertains to a process for manufacturing alkyleneamine compounds, comprising the steps of
in a reaction medium reacting an alkyleneurea compound comprising at least one primary amine group, or at least one cyclic secondary amine group, or at least one primary amine group and at least one cyclic secondary amine group, and at least one cyclic alkyleneurea group of formula I Formula I

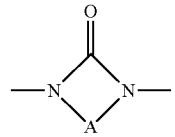

wherein A is selected from the group of C2 to C4 alkylene units, optionally substituted by one or more C1 to C3 alkyl groups, with an alkylhalide compound to form an alkyleneamine hydrohalide salt comprising at least one cyclic alkyleneurea group of formula I, the alkylhalide compound being selected from the group of haloalkanes with 2-6 halogen atoms, and haloaminoalkanes, and
reacting the alkyleneamine hydrohalide salt with a base to form an alkyleneamine compound comprising at least one cyclic alkyleneurea group of formula I.

10 Claims, 1 Drawing Sheet

(56) References Cited

FOREIGN PATENT DOCUMENTS

| | | |
|---|---|---|
| DE | 3214909 A1 | 10/1983 |
| JP | H1117247 A | 6/1999 |
| JP | 2014019644 A | 2/2014 |
| RU | 2451679 C1 | 5/2012 |
| SU | 176303 A1 | 1/1965 |
| WO | 2010042158 A1 | 4/2010 |
| WO | 2012035421 A2 | 3/2012 |
| WO | 2017137529 A1 | 8/2017 |
| WO | 2018166938 A1 | 9/2018 |
| WO | 2019011709 A1 | 1/2019 |
| WO | 2019011711 A1 | 1/2019 |
| WO | WO-2019011708 A1 * | 1/2019 ........... C07C 209/16 |
| WO | 2019030188 A1 | 2/2019 |
| WO | 2019030191 A1 | 2/2019 |
| WO | 2019030193 A1 | 2/2019 |
| WO | 2019030195 A1 | 2/2019 |

OTHER PUBLICATIONS

Bobylev Va et al: "Nucleophilic cleavage 11 and the formation of saturated heterocycles. IX. Kinetics of the amination of 1-aziridine", Journal of General Chemistry of the USSR, vol. 59, No. 5.2, 1989, pp. 1003-1007, XP055579632.

* cited by examiner

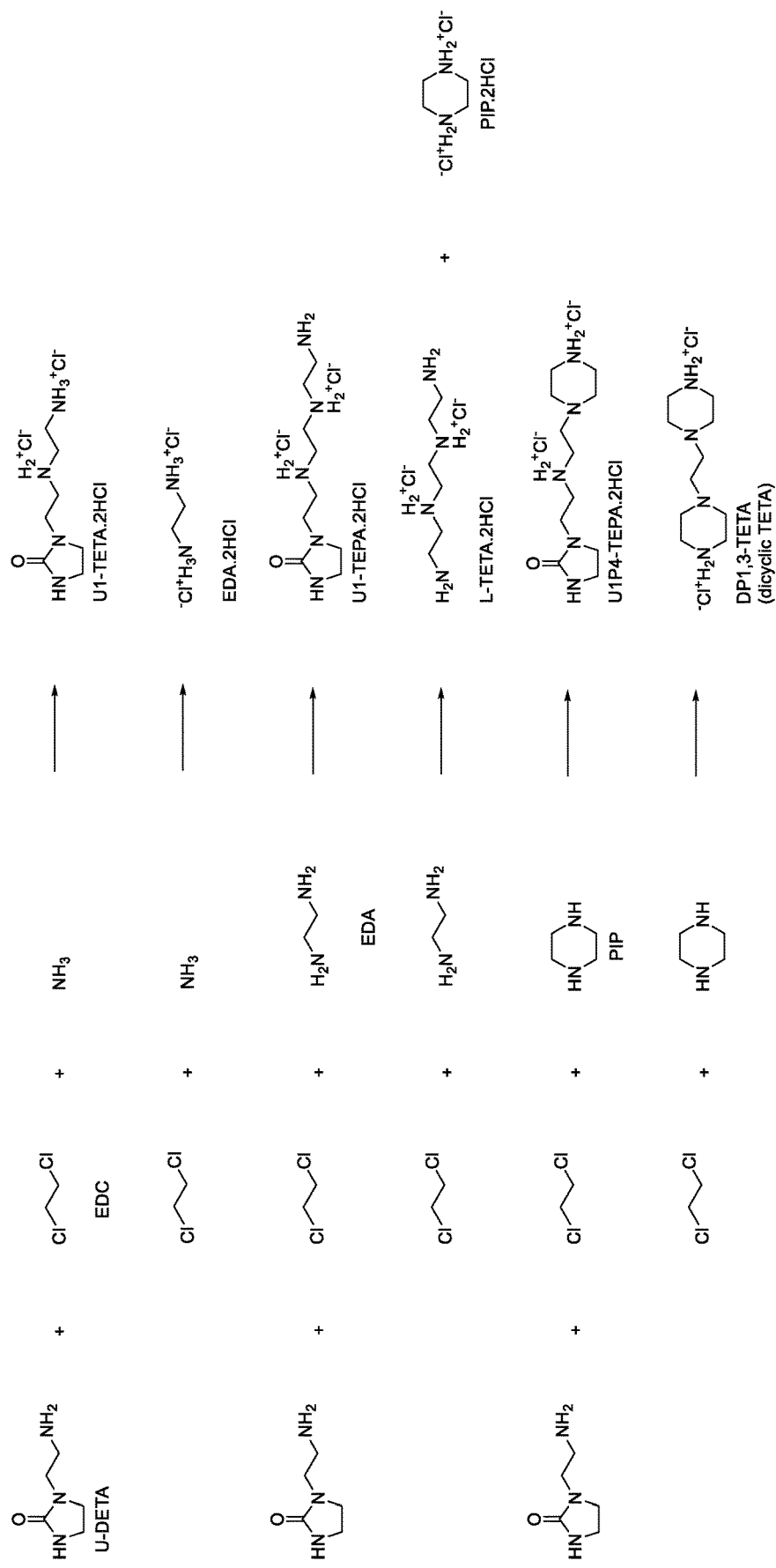

PROCESS FOR MANUFACTURING ALKYLENEAMINE COMPOUNDS

CROSS-REFERENCE TO RELATED APPLICATION

This application is a U.S. National-Stage entry under 35 U.S.C. § 371 based on International Application No. PCT/EP2020/052777, filed Feb. 4, 2020 which was published under PCT Article 21(2) and which claims priority to European Application No. 19155974.9, filed Feb. 7, 2019, which are all hereby incorporated in their entirety by reference.

TECHNICAL FIELD

The present disclosure pertains to a process for manufacturing alkyleneamine compounds. The term alkyleneamine compounds encompasses polyalkylenepolyamines and urea- and alkyl-derivatives thereof.

BACKGROUND

Ethyleneamines, in particular higher ethylene amines such as triethylenetetramine (TETA), tetraethylenepentamine (TEPA), and pentaethylenehexamine (PEHA) are attractive products from a commercial point of view.

Today, the main route for manufacturing higher polyethyleneamines, that is, ethyleneamines containing three of more ethylene units, is by reaction of 1,2-dichloroethane, also indicated as ethylenedichloride or EDC, with aqueous ammonia and/or one or more ethylene amine(s). In a substitution reaction ethyleneamine hydrochlorides are formed, which are then neutralized by reaction with caustic, to generate ethyleneamines and NaCl. This process is often indicated as the EDC route. The EDC route results in a mixture of many types of ethyleneamines, including straight-chain, branched, and piperazine-containing ethyleneamines. Straight-chain compounds include e.g., ethylenediamine (EDA), diethylenetriamine (DETA), linear triethylenetetramine (L-TETA), and even higher ethyleneamines such as linear tetraethylenepentamine (L-TEPA), etc. Piperazine-containing compounds are piperazine (PIP), N-aminoethylpiperazine (AEP), and N,N' diaminoethylpiperazine. Branched compounds such as tris-aminoethylamine (TAEA) are also formed.

There is need in the art for an efficient process for the manufacture of higher ethyleneamines, and alkyleneamine compounds in general, which provides the desired compounds in high yield and/or selectivity in an efficient manner. In particular, there is need in the art for a process which produces less cyclic and branched side products, and more straight-chain higher alkyleneamine compounds, in particular straight-chain higher alkyleneamine compounds which can be converted to straight-chain ethyleneamines selected from L-TETA, L-TEPA, and L-PEHA.

It is noted that DE3214909 describes quaternary ammonium compounds suitable for use as additive for improving the adhesion of dyes to textiles, in particular the wet fastness of the dye. The quaternary ammonium compound comprises a cyclic alkyleneurea structure. It may be prepared by reacting the tertiary amine group of an alkyleneamine comprising a tertiary amine group and a cyclic alkyleneurea structure with 1,2-dichloroethane. This reference does not disclose the manufacture of polyalkyleneamine compounds as contemplated herein.

SU176303 describes a process wherein 1,2-dichloroethane is reacted with urea, followed by hydrolysis of the resulting product to form ethylenediamine. This reference does not disclose the use of alkyleneureas.

BRIEF SUMMARY

This disclosure provides a process for manufacturing alkyleneamine compounds, comprising the steps of
in a reaction medium reacting
an alkyleneurea compound comprising at least one primary amine group, or at least one cyclic secondary amine group, or at least one primary amine group and at least one cyclic secondary amine group, and at least one cyclic alkyleneurea group of formula I

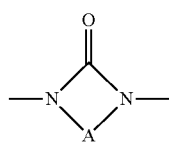

Formula I wherein A is selected from the group of C2 to C4 alkylene units, with
an alkylhalide compound to form an alkyleneamine hydrohalide salt comprising at least one cyclic alkyleneurea group of formula I, the alkylhalide compound being selected from the group of haloalkanes with about 2-about 6 halogen atoms, and haloaminoalkanes, and
reacting the alkyleneamine hydrohalide salt with a base to form an alkyleneamine compound comprising at least one cyclic alkyleneurea group of formula I.

BRIEF DESCRIPTION OF THE DRAWINGS

The present disclosure will hereinafter be described in conjunction with the following drawing FIGURES, wherein
FIG. 1 illustrates some of the reactions that may occur in one embodiment of the process as contemplated herein.

DETAILED DESCRIPTION

The following detailed description is merely exemplary in nature and is not intended to limit the present disclosure or the application and uses of the present disclosure. Furthermore, there is no intention to be bound by any theory presented in the preceding background of the present disclosure or the following detailed description.

The present disclosure pertains to a process for manufacturing alkyleneamine compounds, comprising the steps of
in a reaction medium reacting an alkyleneurea compound comprising at least one primary amine group, or at least one cyclic secondary amine group, or at least one primary amine group and at least one cyclic secondary amine group, and at least one cyclic alkyleneurea group of formula I

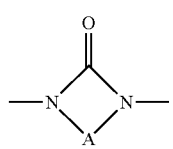

Formula I wherein A is selected from the group of C2 to C4 alkylene units, optionally substituted by one or more C1 to C3 alkyl groups, with an alkylhalide compound to form an alkyleneamine hydrohalide salt comprising at least one cyclic alkyleneurea group of formula I, the alkylhalide compound being selected from the group of haloalkanes with about 2-about 6 halogen atoms, and haloaminoalkanes, reacting the alkyleneamine hydrohalide salt with a base to form an alkyleneamine compound comprising at least one cyclic alkyleneurea group of formula I.

Especially when it is part of other formula's the structure of formula I is sometimes also presented as —N(A)(CO)N— in the present specification.

The process as contemplated herein makes it possible to manufacture higher alkyleneamine compounds in an efficient manner and selective manner, with a reduced amount of piperazine-containing and branched side products. The alkyleneamine compounds comprising at least one cyclic alkyleneurea group can be converted to alkyleneamines by removal of CO. They also find use in industry in themselves. Further advantages of the present disclosure and specific embodiments thereof will become apparent from the further specification.

The present disclosure will be elucidated below.

In the first step of the process as contemplated herein an alkyleneurea compound is reacted with an alkylhalide compound in a reaction medium.

The alkyleneurea compound comprises at least one primary amine group, or at least one cyclic secondary amine group, or at least one primary amine group and at least one cyclic secondary amine group, and at least one cyclic alkyleneurea group of formula I

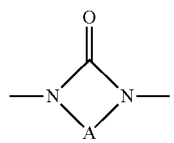

Formula I wherein A is selected from the group of C2 to C4 alkylene units, optionally substituted by one or more C1 to C3 alkyl groups.

In the cyclic alkyleneurea group, it is preferred for A to be a C2 to C3 alkylene unit, optionally substituted with one or two C1 alkyl groups. A preferably is selected from the group of ethylene, propylene, and isopropylene, specifically ethylene.

The alkyleneurea compound has at least one cyclic secondary amine group, or at least one primary amine group or both. The primary amine group or the cyclic secondary amine group will react with the alkylhalide compound. The cyclic secondary amine group in the context of the present specification is a group of the formula

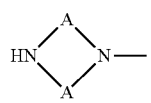

wherein A has the meaning discussed above.

In one embodiment, the alkyleneurea compound is a compound of formula II:

R2-[-X-A-]q-N(A)(CO)N-[A-X-]p-A-NH2   Formula II:

Wherein R2 is selected from H and C1 to C6 alkyl groups which are optionally substituted by one or more groups selected from —OH and —NH2, in particular zero, one, or two groups selected from —OH and —NH2;

X is on each occurrence independently selected from —O—, —NR2-, groups of Formula I, and groups of Formula III:

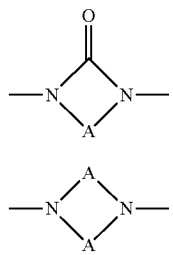

Formula I

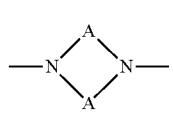

Formula III

A has the meaning discussed above,
p is an integer in the range of from about 0 to about 8, and
q is an integer in the range of about 0 to about 8.

The preferences for A given above also apply here. It is particularly preferred for A to be ethylene.

It is preferred for X to be selected from —NH—, groups of Formula III, and groups of Formula I.

Where it is desired to manufacture straight-chain alkyleneamines, it is preferred for X to be selected from NH and groups of formula I.

It is preferred for R2 to be selected from H, ethyl, propyl, and isopropyl, in particular ethyl, optionally substituted by one or two groups selected from —OH and —NH2. It is particularly preferred for R2 to be ethyl, or propyl, in particular ethyl, substituted with —NH2 at the second carbon atom (aminoethyl or aminoisopropyl) or, in the case of propyl, at the third carbon atom.

As the reaction of large molecules to form even larger molecules is not always aimed at, it may be preferred for the total of p and q to be at most about 8, in some embodiments at most about 4, or at most about 2. Examples of preferred compounds of Formula II are the urea adduct of diethylene triamine (U-DETA), the monourea adduct of triethylene tetramine, wherein the urea group may be at the terminal ethylene moiety or at the central ethylene moiety (U1-TETA and U2-TETA), and the mono- and di-urea adducts of tetraethylenepentamine with a primary amine group (U1-TEPA, U2-TEPA, DU1,3-TEPA). These compounds are particularly attractive if it is desired to produce linear polyethyleneamines and their respective urea products.

Examples of other compounds which may be used in the process as contemplated herein are compounds including an ethylene amine chain provided with a urea group over the nitrogen atoms on each side of the terminal ethylene moiety and with an ethylene chain over the nitrogen atoms on each side of another ethylene moiety, e.g., U1P3-TEPA and U1P4-TEPA.

In general, in the present specification, the compounds are named as follows. The letter code refers to the longest linear ethyleneamine chain. A U refers to the presence of a cyclic urea group, resulting from the presence of a urea group over two adjacent nitrogen atoms connected through an ethylene moiety, i.e., a group of formula I wherein A is an ethylene group.

A P refers to the presence of a piperazine moiety resulting from the presence of an ethylene moiety over two adjacent nitrogen atoms connected through an ethylene moiety, i.e. a group of Formula III wherein both As are ethylene groups.

Numbers after the U or P prefix refer to the respective nitrogen atom in the chain in order to distinguish among different possible structures.

Letters preceding the U or P prefix refer to the number of groups, with D standing for di, or two groups, T standing for tri and tetra, or three and four groups, respectively. Where T is used, it will be clear from the context whether tri or tetra is meant.

In another embodiment, the alkyleneurea compound is a compound of formula IV

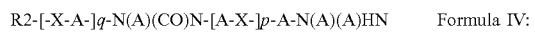

R2-[-X-A-]q-N(A)(CO)N-[A-X-]p-A-N(A)(A)HN    Formula IV:

wherein R2, X, A, q and p have the meanings given above. The preferences given above also apply here.

Examples of preferred compounds of formula IV include the urea adduct of piperazinoethylethylenediamine (UP-TETA).

Mixtures of alkyleneurea compounds may also be employed.

In the process as contemplated herein, the alkyleneurea compound is reacted with an alkylhalide compound, which is discussed below. The alkylhalide compound is selected from the group of haloalkanes with about 2-about 6 halogen atoms, and haloaminoalkanes.

In one embodiment, the alkylhalide compound is a haloalkane with about 2-about 6 halogen atoms, i.e., an alkane substituted with about 2-about 6 halogen atoms. In one embodiment, the alkylhalide compound is a dihaloalkane, more specifically a C2-C10 alkane substituted with two halogen atoms, in particular two chlorine atoms. When dihaloalkanes are used, both halogen atoms on the molecule will react with alkyleneurea compounds, resulting in the formation of longer molecules. As will be discussed in more detail below, this makes for an attractive process for manufacturing higher alkyleneamines. In the case of dihaloalkanes it may be preferred for the halogen atoms to be at opposite ends of the alkane chain, i.e. alpha-omega dihaloalkanes. The use of haloalkanes with more than two, e.g., about 3, about 4, . . . up to about 6 halogen atoms is also possible, although it will result in the formation of complicated reaction mixtures. It is generally preferred for the haloalkane to be a C2-C10 dihaloalkane, in particular a C2-C4 dihaloalkane. Particularly preferred compounds are 1,1-dichloroethane, 1,2-dichloroethane (which is often indicated as ethylenedichloride or EDC), 1,2-dichloropropane, and 1,3-dichloropropane, with ethylenedichloride being particularly preferred. 1,2,3-trichloropropane (TCP) may also be attractive.

In one embodiment, the alkylhalide compound is an aminoalkylhalide, otherwise indicated as a haloaminoalkane. A haloaminoalkane is an alkane, specifically a C2-C10 alkane substituted with one or more halogen atoms and one or more aminogroups. The combination of one or more halogen atoms and one or more amino groups makes for compounds with interesting dual reactivity. In this embodiment, the haloaminoalkane may have about one, about two, or more, say, up to about six, halogen substituents, in particular about one or about two, more in particular about 1. The haloaminoalkane may have about one, about two, or more, say, up to about six, aminogroups, in particular one or two, more in particular about 1. The alkane preferably is a C2-C4 alkane. Particularly preferred compounds are 1-chloro-2-amino-ethane, 1-chloro-3-aminopropane, and 1-chloro-2-aminopropane or their respective hydrochloride salts.

The halogen in the alkylhalide compound may be selected from chlorine, bromine, and iodine. Compounds containing more than one type of halogen may also be used. Although the use of compounds containing bromine and iodine is technically feasible, the use of compounds containing chlorine is generally preferred in view of their higher availability. Additionally, chloride-containing waste streams are easier to process than bromide- of iodide-containing waste streams. Accordingly, it is generally preferred for the alkylhalide compound to be an alkylchloride compound.

As will be evident to the skilled person, it is possible to use combinations of different alkylhalide compounds in the process as contemplated herein.

The reaction between the alkyleneurea compound and the alkylhalide compound generally takes place at a temperature in the range of from about 20 to about 250° C., in particular in the range of from about 40-about 220° C. In one embodiment, the temperature is in the range of from about 40-about 150° C., in particular in the range of from about 80-about 120° C. In other embodiments, in particular in cases where the reaction medium comprises further amine compounds, higher temperatures may be preferred, e.g., in the range of from about 100-about 220° C., in particular in the range of from about 120-about 200° C.

The reaction between the alkyleneurea compound and the alkylhalide compound generally takes place at a pressure in the range of atmospheric to about 150 bar, depending on the components present in the reaction medium and on the reaction temperature. In general, the pressure is the pressure applied to ensure that the reaction takes place in the liquid phase at the specified temperature. In some embodiments, especially where the reaction is at a temperature below about 120° C., the pressure will generally be in the range of from about 1-about 10 bar. In other embodiments, especially in the case of reactions in the presence of ammonia, as will be discussed below, it may be desirable to use relatively high pressures, e.g., in the range of from about 10-about 80 bar, in particular from about 20-about 50 bar.

The reaction takes place in a liquid reaction medium, that is, a reaction medium which is liquid under reaction conditions. The reaction may take place in the presence of a solvent. Suitable solvents are compounds which allow solvation of the reactants without substantially interfering with the reaction. Water is a suitable solvent. Other suitable solvents include aromatic and aliphatic hydrocarbons such as benzene and xylene, alcohols such as methanol, ethanol, propanol, isopropanol, butanol, isobutanol, secondary butanol and tertiary butanol, esters such as methyl acetate or ethyl acetate and ethers such as diisopropyl ether, diisobutyl ether, glycol dimethyl ether, diglycol dimethyl ether, dioxane and tetrahydrofuran (THF). Solvent combinations may also be used. It is within the scope of the skilled person to select a suitable solvent.

The time necessary for the reaction will depend on the desired degree of conversion, the nature and concentration of the reactants, and the reaction temperature. In general, the reaction time will be between about 5 minutes and about 24 hours, more specifically in the range of about 10 minutes to about 12 hours, in some embodiments in the range of about 0.5 to about 8 hours.

The ratio between the various compounds is dictated by the number of halide substituents in the alkylhalide and the number of primary or cyclic secondary amine groups. To ensure that the amount of alkylhalide present during further processing is minimised, it is preferred for the ratio between the number of primary or cyclic secondary amine groups and the number of halogen substituents in the alkylhalide in the reaction medium to be at least about 1:1, in particular at least about 1.05:1, more in particular at least about 1.3:1. As a maximum a value of about 30:1 may be mentioned. The preferred ratio will depend on the components in the reaction mixture. In one embodiment, generally where the reaction mixture does not contain ammonia, the maximum value may be at most in particular about 10:1, in particular about 5:1 may be mentioned. In embodiments where the reaction medium comprises ammonia, as will be discussed further on, higher ratios may be desired, e.g., in the range of from about 10:1 to about 30:1, in particular from about 15:1 to about 25:1.

The product of the reaction between the alkyleneurea compound and the alkylhalide compound is a hydrohalide salt of an alkyleneamine or an alkylamine. The next step of the process as contemplated herein is neutralizing the salt with a base to form an alkyleneamine comprising at least one cyclic alkyleneurea group, with a halide salt as side product. The use of strong inorganic bases such as NaOH and KOH is generally preferred from an economic point of view, and because the resulting Na-halide and K-halide salts are relatively easy to separate from the alkyleneamine comprising at least one cyclic alkyleneurea group, should this be desired.

The amount of base can be calculated from the amount of alkyleneamine or alkylamine hydrohalide salt. In general, the molar ratio of hydroxide ions derived from the base to halide-ions in the salt is in the range of from about 1:1 to about 10:1. The base can be provided in dissolved form, e.g., in the form of a solution in water. For reasons of process efficiency, it is preferred that water is used as solvent in the reaction between the alkyleneurea compound and the alkylhalide compound and as a solvent for the base. Neutralisation of the alkyleneamine hydrohalide salt will generally take place at a temperature in the range of from about 0 to about 200° C. in particular in the range of from about 10 to about 150° C. Reaction pressure is not critical and can. e.g., be in the range of atmospheric to about 15 bar, more in particular in the range of atmospheric to about 3 bar. In general, the reaction time will be between about 1 minute and about 24 hours, more specifically in the range of from about 10 minutes to about 12 hours, in some embodiments in the range of from about 0.5 to about 8 hours.

The product from this reaction will be an alkyleneamine comprising at least one cyclic alkyleneurea group, further also indicated as U-alkyleneamine, with a halide salt as side product. The U-alkyleneamine and the halide salt can be separated in various manners. For example, the U-alkyleneamine can be removed by evaporation. For another example, the halide salt can be removed by crystallization followed by phase separation. For a further example, the addition of an anti-solvent may result in precipitation of the U-alkyleneamine, while keeping the halide salt in solution, or vice versa, followed by removal of the precipitate. Combinations of the various separation methods are also possible.

In one embodiment, the present disclosure makes it possible to selectively manufacture high-molecular weight polyalkylpolyamine compounds. In the alkyleneurea used as starting material in the process as contemplated herein, each C=O moiety blocks two nitrogen atoms from reacting with the alkylhalide compound. This reduces the possibility of formation of a broad range polyalkylpolyamine products. For example, in cases where a primary amine group is blocked by a C=O moiety, the molecule is blocked from forming a piperazine ring.

In one embodiment, the process as contemplated herein results in the formation of U-alkyleneamine compounds of the following formula V:

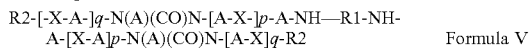

R2-[-X-A-]$q$-N(A)(CO)N-[A-X-]$p$-A-NH—R1-NH-A-[X-A]$p$-N(A)(CO)N-[A-X]$q$-R2            Formula V In this formula, R2, X, A, p and q have the meaning indicated above. R1 is an alkylene chain resulting from the alkylhalide compound, having about 2-about 10 carbon atoms, in particular about 2-about 4 carbon atoms. The compound of formula VI is obtained when the alkylhalide compound is a dihaloalkane of the formula Y—R1-Y, wherein Y is a halogen selected from the group of Cl, Br, and I, with Cl being preferred.

For example, the reaction of ethylene dichloride with U-DETA in a molar ratio of about 1:2 results in the formation of DU1,5-PEHA of the formula

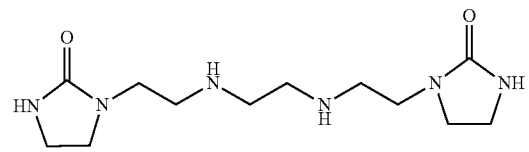 [SMILES: O=C1NCCN1CCNCCNCCN1CCNC1=O]

As illustrated in Example 1, this compound can be obtained in a high selectivity in the process as contemplated herein.

For another example, the reaction of ethylenedichloride with U-DETA and piperazine results in the formation of U1-P4-TEPA of the formula

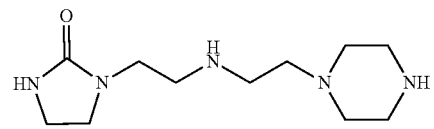 [SMILES: O=C1NCCN1CCNCCN1CCNCC1]

A preferred embodiment of the process according to the present disclosure comprises a process wherein the urea adduct of diethylenetriamine is reacted with ethylene dichloride, resulting in the formation of the diurea additive of pentaethylenehexamine.

In one embodiment, the process according to the present disclosure results in the formation of U-alkyleneamine products of formula VI:

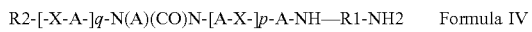

R2-[-X-A-]$q$-N(A)(CO)N-[A-X-]$p$-A-NH—R1-NH2            Formula IV with R1, R2, X, A, p and q having the meaning given above. This compound can be obtained when the alkylhalide compound is a haloaminoalkane of the formula Y—R1-NH2, wherein Y has the meaning indicated above. Below the reaction of U-DETA with aminoethylenechloride to form U-TETA and the reaction of U-TETA with aminoethylenechloride to form U-TEPA are illustrated. There are two arrows to indicate that the reaction comprises two steps namely the formation of hydrochloride (not shown)—and a neutralization reaction, both of which can, of course, be carried out in a single step process.

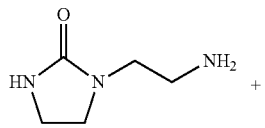

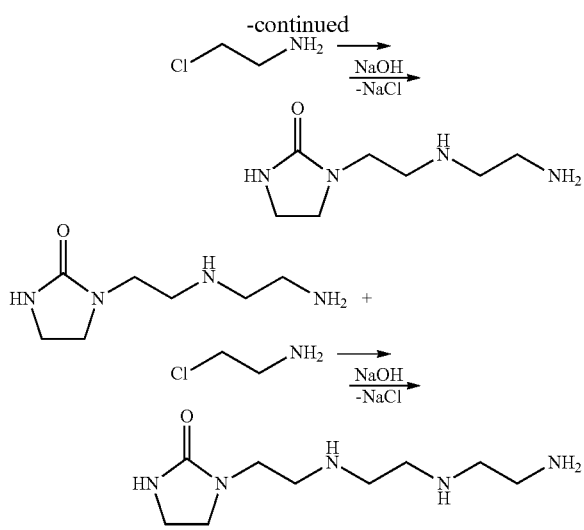

The U-alkyleneamine can be processed as desired. In one embodiment, the U-alkyleneamine is converted to the corresponding alkyleneamine under the removal of CO2, wherein this step is carried out simultaneously with or subsequent to the step of reacting the alkyleneamine hydrochloride salt with a base. This process, which may be indicated as a CO2 elimination step, can be done in various ways.

In one embodiment, the U-alkyleneamine is reacted in the liquid phase with water to form the corresponding alkyleneamine, under removal of CO2. The reaction with water generally takes place at a temperature of at least about 150° C. If the reaction temperature is below about 150° C., the U-alkyleneamine will not react to a significant extent. It is preferred for the reaction to be carried out at a temperature of at least about 180° C., in particular at least about 200° C., more in particular at least about 230° C., or even at least about 250° C. Preferably the temperature during this step does not exceed about 400° C., in particular at most about 350° C., more in particular at most about 320° C.

The pressure during the process is not critical, as long as the reaction medium is in the liquid phase. As a general range, a value of from about 0.5 to about 100 bar may be mentioned, depending on the desired temperature. It is preferred for the CO2 removal step to be carried out at a pressure of at least about 5 bar, in particular at least about 10 bar, to maintain a sufficient amount of amine and water in the medium. In view of the high costs associated with high-pressure apparatus, it may be preferred for the pressure to be at most about 50 bar, in particular at most about 40 bar.

The amount of water depends on the desired degree of conversion and on the process conditions. In general, the amount of water is at least about 0.1 mole water per mole urea moiety in the feedstock. Higher amounts are often used, e.g., at least about 0.1 mole water per mole urea moiety, in particular at least about 0.5 mole water per mole urea moiety. The maximum is not critical for the process according to the present disclosure, but too large amounts of water will lead to unnecessarily large equipment being required. As a general maximum an amount of at most about 500 mol water per mole cyclic ethylene urea moiety may be mentioned, in particular at most about 300 mole, more in particular at most about 200 mol, in some embodiments at most about 100 mol, or at most about 50 mol.

It is preferred to carry out CO2 removal during the reaction, e.g., by venting the reaction vessel, and preferably by the provision of a stripping gas such as nitrogen or steam.

In one embodiment the U-alkyleneamines are reacted in the liquid phase with water in an amount of from about 0.1-about 20 mole water per mole urea moiety, at a temperature of at least about 230° C., with removal of CO2. It has been found that the use of a low amount of water in combination with a relatively high temperature and CO2 removal results in an efficient process which good conversion and low formation of side products.

In one embodiment, the U-alkyleneamine is reacted with an alkyleneamine that is capable of
picking up a carbonyl moiety, resulting in the conversion of the U-alkyleneamine into its corresponding alkyleneamine and simultaneous conversion of the alkyleneamine that is capable of picking up a carbonyl moiety into a U-alkyleneamine. This process may be described as a carbonyl transfer reaction.

In a further embodiment, the U-alkyleneamine is reacted with a strong base, i.e., a base with a pKb of less than about 1, to form the corresponding alkyleneamine and a carbonate salt.

The use of a strong inorganic base is considered preferred. In one embodiment, the strong inorganic base is selected from the group of metal hydroxides, in particular from the group of hydroxides of alkaline and earth alkaline metals, in particular from sodium hydroxide, potassium hydroxide, lithium hydroxide, calcium hydroxide, magnesium hydroxide, and barium hydroxide. In one embodiment, the strong inorganic base is selected from the group of metal oxides, in particular from the group of oxides of alkaline and earth alkaline metals, in particular from calcium oxide, magnesium oxide, and barium oxide. Selecting a strong inorganic base from the group of sodium hydroxide, potassium hydroxide, magnesium (hydr)oxide, and calcium (hydr)oxide may be preferred. The use of sodium hydroxide and potassium hydroxide may be particularly considered preferred. Other strong inorganic bases may also be used, such as ammonium hydroxide. As will be evident to the skilled person, mixtures of various inorganic bases can be used. Compounds comprising a base in addition to other components can also be used, as can be compounds which will be converted into inorganic bases in the reaction medium. The molar amount of base can be calculated with respect to the molar amount of alkyleneurea moieties that are to be converted. A value of at least about 0.2:1 may be mentioned. If it is desired to obtain full conversion of the alkyleneurea moieties into the corresponding alkyleneamine compound, the use of larger amounts may be preferred, e.g., in a molar ratio of at least about 1:1, in particular at least about 1.5:1. It may be preferred to use larger amounts to increase the reaction rate, e.g., a molar ratio of at least about 2:1, in particular at least about 2.5:1. As large amounts of base do not contribute to further conversion but will lead to additional costs, it is preferred for the molar ratio of the base to the molar amount of alkyleneurea be at most about 20:1, in particular at most about 15:1, more in particular at most 10:1. It has been found that even lower amounts of inorganic base can suffice. More in particular, it has been found that good results can be obtained at a molar ratio of base to alkyleneurea moieties of at most about 7.5:1, in particular at most about 6.5:1, even more in particular at most about 5.5:1. It has been found that the use of a molar ratio of at most about 5.5:1 results in full conversion of the alkyleneurea moieties and high yield of the resulting alkyleneamine compounds. It may be preferred to use even less base per mole of alkyleneurea moiety, e.g., in a molar ratio of at most about 5:1, in particular at most about 4:1, more in particular at most about 3:1.

The treatment with base can, for example, be carried out by contacting the material to be treated with a concentrated aqueous solution of the inorganic base. Depending on the nature of the base and the further composition of the reaction mixture, it may also be possible to add the base in solid form and dissolve it in the reaction medium. As will be clear to the skilled person, the aim is to bring the base in a dissolved state, so that the hydroxy groups can react with the CO2 adduct, while avoiding unnecessary dilution of the reaction medium. The reaction can be carried out at a temperature between room temperature and about 400° C. The temperature and pressure should be selected such that the reaction mixture is in the liquid phase. Higher temperatures are advantageous because they lead to decreased reaction times. It may be preferred to carry out the reaction at a temperature of at least about 100° C., in particular at least about 140° C., in particular at least about 170° C. On the other hand, higher temperatures may lead to the undesired formation of side products. It may therefore be preferred to carry out the reaction at a temperature of at most about 350° C., in particular at most about 280° C.

Depending on the reaction temperature, the reaction time can vary within wide ranges, e.g., between about 15 minutes and about 24 hours. It may be preferred for the reaction time to vary between about 1 hour and about 12 hours, in particular between about 1 hour and about 6 hours. When using lower amounts of base, longer reaction times may be required to obtain the desired degree of conversion. Upon completion of the reaction, a reaction mixture will be obtained which contains ethyleneamine compounds and a carbonate salt of the inorganic base. The salt can be removed by methods known in the art, e.g., by filtration where the salt is in solid form or more in general by phase separation.

Combinations of the various CO2 elimination steps are also possible, e.g., a combination of a treatment with water with CO2 removal, followed by a treatment with base, optionally with an intermediate product removal step.

As discussed above, the process according to the present disclosure also encompassed a step of reacting the alkyleneamine hydrohalide salt with a base to form an alkyleneamine comprising at least one cyclic alkyleneurea group. If it is intended to convert the alkyleneamine comprising at least one cyclic alkyleneurea group to the corresponding alkyleneamine, it is possible to convert the alkyleneamine hydrohalide salt into the alkyleneamine by reaction with an inorganic base in a single step. The conversion of the U-alkyleneamine into the corresponding alkyleneamine requires more stringent conditions than the conversion of the alkyleneamine hydrohalide salt into the U-alkyleneamine. Therefore, if the two reactions are to be combined in a single step, the conditions and the amount of base should be selected such that both reactions take place. The conditions described above for the conversion of the U-alkyleneamine into the corresponding alkyleneamine should suffice.

An interesting embodiment of the process according to the present disclosure is to use the presence of the alkyleneurea compound to change the product distribution of a process where alkylenedichloride is reacted with one or more of ammonia or additional alkyleneamine compounds to form alkyleneamines, such as the conventional process for the manufacture of ethyleneamines from EDC and (generally aqueous) ammonia.

In this case, the reaction medium will comprise alkyleneurea compound, alkylhalide compound selected from polyhaloalkane or aminohaloalkane, and one or more of ammonia and additional alkyleneamine compounds, the additional alkyleneamine compounds being selected from the group of alkyleneamines of the formula H2N-[A-X-]x-A-NH2, wherein x is an integer in the range of from a about 0-8, compounds of the formula Y-[A-X-]x-A-NH2, wherein Y is a piperazine ring and x is an integer in the range of from about 0-8, and piperazine. It may be preferred to select the additional alkyleneamine compound, if present, from the group of ethyleneamines of the formula H2N—[CH2-CH2-NH-]x-CH2-CH2-NH2, wherein x is an integer in the range of from about 0-about 8, compounds of the formula Y—[CH2-CH2-NH-]x-CH2-CH2-NH2, wherein Y is a piperazine ring and x is an integer in the range of from about 0-about 8, and piperazine, in particular from ethylenediamine, diethylenetriamine, triethylenetetramine, and piperazine. Of course, combinations of different additional alkyleneamine compounds may also be used.

The alkylhalide compound will react with the ammonia or additional alkyleneamine compound to form alkylamine hydrohalide salts. The alkylhalide will also react with one or two alkyleneurea compound to form an alkyleneamine hydrohalide salt comprising at least one cyclic alkyleneurea group. FIG. 1 illustrates some of the reactions that can occur when the urea derivative of diethylenetriamine is reacted with ethylene dichloride in the presence of ammonia, ethylenediamine or PIP, and the resulting hydrochloride salts.

The composition comprising the various alkylamine hydrohalide salt compound is reacted with a base to convert the salts into the corresponding amine products. Depending on the amount of base and the conversion conditions, the resulting product is a mixture comprising alkyleneamines and optionally U-alkyleneamines. If U-alkyleneamines are present, they can be converted to alkyleneamines by the methods given above.

In this embodiment, where alkylenedichloride is reacted with one or more of ammonia or additional alkyleneamine in the presence of an alkyleneurea, the ratio between the various compounds is dictated by the number of halide substituents in the alkylhalide and the total number of primary amine groups, cyclic secondary amine groups, and ammonia. To ensure that the amount of alkylhalide present during further processing is minimised, it is preferred for the ratio between the total number of primary amine groups, cyclic secondary amine groups, and ammonia and the number of halogen substituents in the alkylhalide in the reaction medium to be at least about 1.05:1, in particular at least about 1.1:1. As a maximum a value of about 30:1 may be mentioned. Especially in the case where the system comprises ammonia, a relatively high ratio, e.g., of at least about 5:1, may be preferred. In this embodiment a range of from about 10:1 to about 30:1 may be preferred, in particular from about 15:1 to about 25:1.

In this embodiment, where alkylenedichloride is reacted with one or more of ammonia or additional alkyleneamine in the presence of an alkyleneurea, it may be preferred to operate at relatively high temperatures, e.g., in the range e.g., in the range of from about 100-about 220° C., in particular in the range of from about 120-about 200° C. In this embodiment, especially in the case where ammonia is used as reactant, it may be preferred to operate at relatively high pressures, e.g., in the range of from about 10-about 80 bar, in particular from about 20-about 50 bar. The general ranges give above for the process according to the present disclosure also apply here.

The resulting product slate is determined by the relative amounts of the alkyleneurea compound on the one hand and the total amount of ammonia and additional alkyleneamine compounds on the other hand. For a meaningful change of the product slate as compared to a process carried out in the absence of alkyleneurea compounds, it is generally preferred for the ratio between the total of primary amine groups and cyclic secondary amine groups derived from the alkyleneurea compound and the total of primary amine groups and cyclic secondary amine groups derived from the ammonia and additional alkyleneamine compound to be at least about 0.1:1, in particular at least about 0.2:1. The maximum is generally at most about 20:1, in particular at most about 10:1. If this value is exceeded, the amount of ammonia and additional alkyleneamine compounds will be so low that their influence on the product slate may be insufficient to be worth the effort. It is within the scope of the skilled person to determine a suitable ratio between the different starting materials.

Examples of processes according to this embodiment of the present disclosure, where alkylenedichloride reacted with one or more of ammonia or additional alkyleneamine compound and alkyleneurea compounds are the following:

Reaction of U-DETA with ethylenedichloride and ammonia to form U1-TETA

Reaction of U-DETA with ethylenedichloride and ethylenediamine to form U1-TEPA

Reaction of U-DETA with ethylenedichloride and piperazine to form U1P4-TEPA

As will be evident to the skilled person, the products formed in this reaction can also react with ethylenedichloride, and the ammonia or ethylene amine compound or piperazine can also react with ethylene dichloride, resulting in the formation of a reaction mixture comprising various components. The presence of an alkyleneurea compound in the reaction mixture results in the formation of more straight-chain ethyleneneamine compounds than would be obtained when no alkyleneurea moieties would be present, and in the formation of less additional piperazine moieties.

The reaction mixture can be processed as desired. Where ammonia is used it may be attractive to recover an ammonia-containing gas stream from the product, and recycle it to the process. Where the reaction mixture contains cyclic ethylenerurea compounds, the entire reaction mixture can be brought under such conditions that the ethylenerurea moieties are converted to ethyleneamine moieties. It is, however, also possible to subject the reaction mixture to a separation step to obtain a fraction having a decreased content of cyclic ethylenerurea compounds and a fraction having an increased content of cyclic ethylenerurea compounds, and to submit the latter fraction to conditions such that ethylenerurea moieties are converted to ethyleneamine moieties. In general, the product from the reaction can be separated as desired through methods known in the art, e.g., through distillation, which the various fractions being processed as desired, e.g., by being isolated as product or by being recycled as starting material.

The starting material of the process according to the present disclosure is an alkyleneurea compound comprising at least one primary amine group, at least one cyclic secondary amine group, or at least one primary amine group and at least one cyclic secondary amine group, and at least one cyclic alkyleneurea group of formula I. Compounds of this type can be obtained by reacting an alkyleneamine compound having a linear —NH-A-NH— moiety with a carbonyl delivering agent at a suitable reaction temperature. Suitable carbonyl delivering agents are compounds containing a carbonyl moiety that can be transferred to a —HN-A-NH-moiety. Examples include carbon dioxide and organic compounds in which a carbonyl moiety is available for being transferred as described above. Organic compounds in which a carbonyl moiety is available for transfer include urea and derivatives thereof; linear and cyclic alkyleneureas, especially cyclic alkyleneurea, mono or di-substituted alkyleneureas, alkyl and dialkyl ureas, linear and cyclic carbamates, organic carbonates and derivatives or precursors thereof. Such derivatives or precursors may for example include ionic compounds such as organic carbonate or bicarbonate salts, carbamic acids and associated salts. Preferably the carbonyl delivering agent is CO2 or an organic compound that is suitable for use as a carbonyl delivering agent and wherein alkylene is ethylene, or an ethyleneurea compound or ethylene carbonate, more preferably the carbonyl delivering agent is at least partly added as carbon dioxide or as ethyleneuruea compound, i.e., a compound containing a group of Formula I. The urea compound can be prepared by combining an alkyleneamine compound having a linear —NH-A-NH— moiety with a carbon oxide delivering agent and heating the mixture to a temperature at which reaction occurs. The reaction is known and requires no further elucidation here. It may be possible to combine the formation of the urea compound with the reaction with alkylhalide, depending on the choice of carbonyl delivering agent and reaction conditions. However, given that the carbonyl moiety compound is often used to block amine groups, it is generally preferred to first prepare the alkyleneurea compound, and only then react the alkyleneurea compound with the alkylhalide compound.

The process according to the present disclosure and the various steps thereof can be carried out in batch operation, fed-batch operation, or in a continuous operation, e.g., in a cascade of continuous flow reactor. Depending on the scale of the operation, continuous operation may be preferred.

In the various structural formulas used herein, all selections of A, R2, and X are independent, unless it is specifically indicated to be otherwise. It is preferred for all alkylene groups to be ethylene groups.

As will be evident to the skilled person, various embodiments of the present disclosure can be combined, unless they are mutually exclusive.

The present disclosure will be illustrated by the following examples, without being limited thereto or thereby.

Example 1: Reaction of EDC with U-DETA 2.5 g (25 mmol) EDC were slowly added to a mixture of 6.9 g (53 mmol) U-DETA and 5 mL distilled water at 50° C. After EDC addition was complete the reaction mixture was heated for 4 h at 105° C., to react U-DETA with EDC to form the hydrochloride salt of DU1,5-PEHA, in accordance with the following reaction:

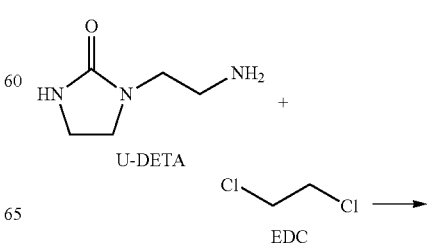

-continued

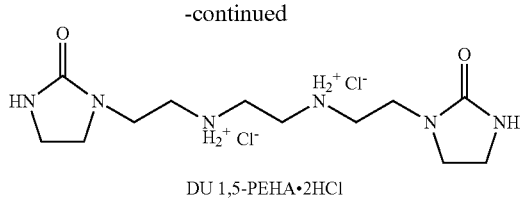

DU 1,5-PEHA·2HCl

To convert the dihydrochloride salt of DU1,5-PEHA to DU1,5-PEHA the reaction mixture was cooled to 50° C. at which point 4.2 mL (80 mmol) 50 wt % aqueous NaOH were added. Then the mixture was kept at 50° C. for a further 30 min. Next, water was removed by evaporation under reduced pressure. 50 mL ethanol was added and the mixture was stirred for 5 min.

The precipitate thus formed was removed by filtration and dried under reduced pressure, which yielded approx. 9 g of a yellowish viscous material comprising DU-1,5-PEHA. The reaction scheme is given below:

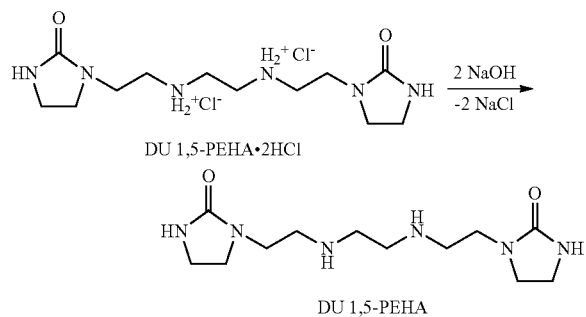

To convert the DU-1,5-PEHA into L-PEHA 4 g of the yellowish viscous material comprising DU-1,5-PEHA, 3.2 g (80 mmol) NaOH and 15 mL distilled water were added to a 45 mL autoclave. The vessel was purged with N2 (g) and then heated to 220° C. during 40 min and heated at 220° C. for 2.5 h. After cooling to room temperature, a sample was removed and analyzed by gas chromatography coupled with a flame ionization detector (GC-FID) using an internal standard. According to GC-FID analysis the sample contained 53% DETA, 33% L-PEHA and 12% (U)-PEHAs. No traces of piperazine-containing or branched (U)-PEHA isomers were found. The high selectivity and yield towards L-PEHA without generating high amounts of high-molecular weight alkyleneamine homologues is very attractive from a commercial point of view. The reaction scheme is given below.

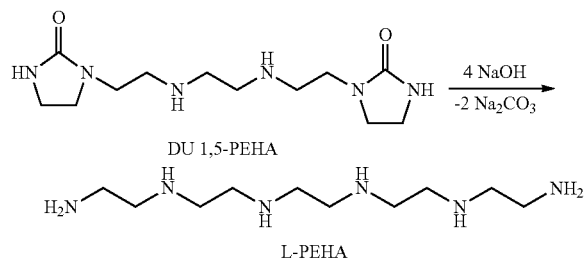

Example 2: Reaction of EDC with U-DETA and Ammonia

A mixture of U-DETA (4.70 g, 36.4 mmol), EDC (3.60 g, 36.4 mmol), and aqueous ammonia (17.7 g, 35%, 364 mmol) was heated for 4 h at 100° C. in a pressure autoclave. The mixture was allowed to cool, NaOH (2.91 g, 72.8 mmol) was added, and the resulting mixture was analysed by GC-FID to give a GC-yield of U1-TETA of 10%. Higher yields can be obtained by optimisation of the reaction.

Example 3: Reaction of EDC, U-DETA, and Piperazine

A mixture of U-DETA (20.4 g, 0.16 mol), piperazine (13.6 g, 0.16 mol) and water (6.4 g) was heated to 65° C. in round bottom flask equipped with inside thermometer, reflux condenser and drop funnel. EDC (6.3 g, 0.06 mol) was slowly added via the drop funnel. After 20 min (end of the exothermic reaction), 50 wt % aqueous NaOH (5.4 g, 0.13 mol) was added, the mixture was stirred at 65° C. for 15 min and was analysed by GC-MS and GC-FID. The reaction is presented below.

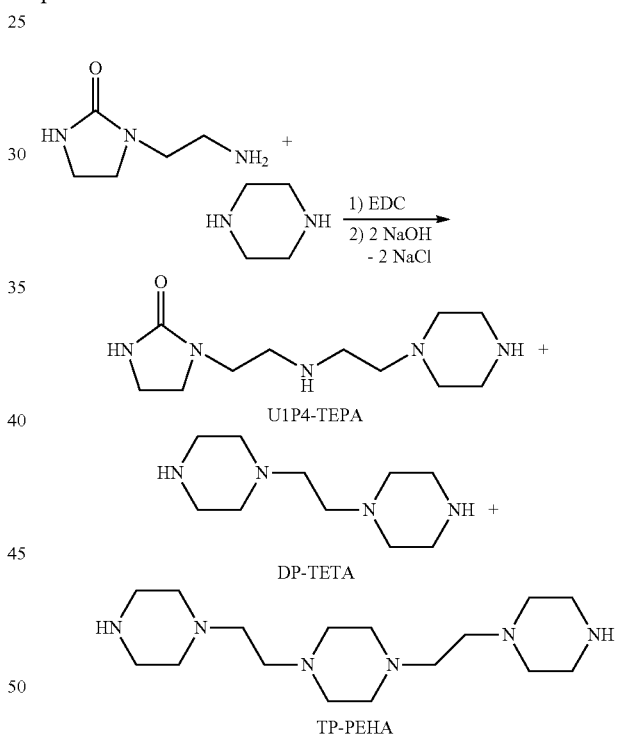

The reaction yielded 6% U1P4-TEPA, 18% DP-TETA and 6% TP-PEHA (GC area %), while substantial amounts of piperazine and U-DETA remained as they were used in molar excess relative to the amount of EDC dosed. Higher boiling components such as DU1,5-PEHA and higher U-compounds may be present, but cannot be detected in the presently used GC-FID and GC-MS setup.

Example 4: Reaction of DETA (Comparative) and U-DETA (Disclosure) with EDC

To investigate the effect of a cyclic urea group on the selectivity of the reaction with EDC, experiments were carried out using either DETA (comparative examples A and B) or U-DETA (example 4.1 according to the present disclosure) as starting material.

DETA or U-DETA, respectively, was reacted with EDC (5M in water) at 100° C. for 30 minutes. The reaction mixture was then treated with 50-wt % aqueous NaOH (2.1 eq relative to EDC). After removing salt and water the product mixture was analysed by GC-MS and GC-FID. The GC-FID results are given as wt % in the table below.

| Experiment | A<br>EDC + DETA<br>Molar ratio 1:2 | B<br>EDC + DETA<br>Molar ratio 1:5 | 4.1<br>EDC + U-DETA<br>Molar ratio 1:2 |
|---|---|---|---|
| EDC (wt. %) | n.d. | n.d. | n.d. |
| DETA (wt. %) | 42.8 | 72.9 | 58.0 |
| AEP (wt. %) | 9.0 | 11.0 | 0.20 |
| L-PEHA (wt. %) | 3.1 | 4.1 | 35.0 | n.d. = not detected

As can be seen from the Table, reacting U-DETA with EDC results in a much higher yield of L-PEHA product and only a small amount of AEP, compared to reacting DETA with EDC.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

What is claimed is:

1. A process comprising the steps of:
   in a reaction medium reacting:
   a urea adduct of diethylene triamine having the following structure:

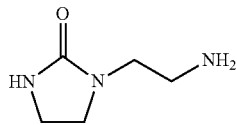

with ethylene dichloride to form a hydrochloride salt of a 1,5-diurea adduct of pentaethylenehexamine, and
reacting the hydrochloride salt with a base to form the 1,5-diurea adduct of pentaethylenehexamine having the following structure:

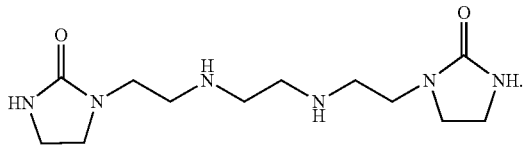 [SMILES: O=C1NCCN1CCNCCNCCN1CCNC1=O]

2. The process of claim 1 wherein the hydrochloride salt of the 1,5-diurea adduct of pentaethylenehexamine has the following structure:

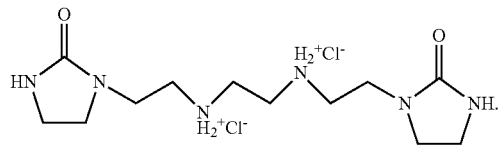

3. The process of claim 2 further comprising the step of reacting the 1,5-diurea adduct of pentaethylenehexamine with a base to form linear pentaethylenehexamine.

4. The process of claim 3 wherein the urea adduct of diethylene triamine is present in a molar excess relative to the ethylene dichloride.

5. The process of claim 4 wherein the molar excess is about (2-2.1):1 of the urea adduct of diethylene triamine to the ethylene dichloride.

6. The process of claim 1 further comprising the step of reacting the 1,5-diurea adduct of pentaethylenehexamine with a base to form linear pentaethylenehexamine.

7. The process of claim 6 wherein the urea adduct of diethylene triamine is present in a molar excess relative to the ethylene dichloride.

8. The process of claim 7 wherein the molar excess is about (2-2.1):1 of the urea adduct of diethylene triamine to the ethylene dichloride.

9. The process of claim 1 wherein the urea adduct of diethylene triamine is present in a molar excess relative to the ethylene dichloride.

10. The process of claim 9 wherein the molar excess is about (2-2.1):1 of the urea adduct of diethylene triamine to the ethylene dichloride.

\* \* \* \* \*